United States Patent
Joseph et al.

(10) Patent No.: US 8,219,547 B2
(45) Date of Patent: Jul. 10, 2012

(54) INDIRECT DATABASE QUERIES WITH LARGE OLAP CUBES

(75) Inventors: Celestine Joseph, Snoqualmie, WA (US); Joyce Behrendt, Issaquah, WA (US); Joshua Chait Caplan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 635 days.

(21) Appl. No.: 12/403,501

(22) Filed: Mar. 13, 2009

(65) Prior Publication Data
US 2010/0235345 A1    Sep. 16, 2010

(51) Int. Cl.
G06F 7/00    (2006.01)
(52) U.S. Cl. ............... 707/717; 707/958; 707/E17.038
(58) Field of Classification Search .................. 707/600, 707/601, 602, 603, 717, 958
See application file for complete search history.

(56) References Cited

U.S. PATENT DOCUMENTS

| | | | |
|---|---|---|---|
| 2004/0236767 A1* | 11/2004 | Soylemez et al. | 707/100 |
| 2005/0004904 A1* | 1/2005 | Keamey et al. | 707/3 |
| 2005/0283488 A1* | 12/2005 | Colossi et al. | 707/100 |

* cited by examiner

*Primary Examiner* — John Cottingham
*Assistant Examiner* — Nirav K Khakhar
(74) *Attorney, Agent, or Firm* — Ogilvie Law Firm

(57) ABSTRACT

A large OLAP cube includes data and dimensions not required for a particular query, or for a collection of queries. A response to a query is generated by using the large OLAP cube rather than using an OLAP cube tailored to the query, and rather than querying the relational database directly. The large OLAP cube may be created after identifying a set of frequently sought data and/or filters used in queries to the relational database. Data may be staged by creating a smaller OLAP cube with data extracted from the large OLAP cube. The cubes may then be queried, browsed, and used to prepare reports or generate flat files.

20 Claims, 3 Drawing Sheets

INDIRECT DATABASE QUERIES WITH LARGE OLAP CUBES

BACKGROUND

A relational database is a database that organizes data using characteristics that are shared by data. For example, a data set containing information about online sales might be grouped by the date a sales transaction occurred, by the products sold, by the buyer's last name, by the payment method, and so on. A relational database organizes data according to relations. A relation may be defined as a set of tuples of data items that have the same attributes. SQL (Structured Query Language) is one tool for retrieving information from relational databases. SQL terminology corresponds with relational database terminology, e.g., SQL tables correspond to relational database relations, SQL rows correspond to tuples, and SQL columns correspond to attributes.

Relational databases are used in many contexts. For example, On-Line Transactional Processing (OLTP) systems are designed and optimized for fast transactional input to relational databases (and other databases) to support business transactions. On-Line Analytical Processing (OLAP) systems are designed and optimized for fast data output to support data analytics and reporting. On-Line Analytical Processing is sometimes referred to without hyphenation as Online Analytical Processing, and despite the name, it does not necessarily require an online data source or other online component.

OLAP derives a multidimensional cube by processing data from a relational database or data warehouse to place measures into dimensions. In the cube the measures are pre-aggregated, which makes data retrieval significantly faster, although some flexibility is generally lost due to the choices made when dimensions are selected and data aggregated. A user may be unable to browse or filter data using database attributes which are not transformed into cube dimensions. The processed cube can be made available to users who can browse the data in the cube. The basic elements of an OLAP cube are measures, dimensions, and schema. Measures are key performance indicators to evaluate in aggregate, e.g., volume, sales, and cost. Dimensions are categories of data analysis, such as the "by" categories in reports, e.g., product, time, and region. For example, in a revenue report by month and by sales region, two dimensions are time and sales region.

As a design practice, an OLAP cube should have relatively few dimensions, e.g., no more than ten or twelve dimensions. A cube with more than about twelve dimensions may be difficult to understand and browse. Too many dimensions can cause confusion among users. Having too many dimensions can also lead to a data explosion, because the amount of data grows exponentially as the number of dimensions increases.

SUMMARY

A commercial database may contain hundreds of gigabytes of data, and additional hundreds of gigabytes of indexes. Accessing such large databases can be time consuming, with some queries taking hours to process. Queries may also be very complex, requiring many different joins and a strong understanding of the database and the query language. Reductions in data size and query complexity can be achieved by creating small OLAP cubes that are tailored to specific queries.

However, some embodiments do not focus on small cubes but instead facilitate querying data of a relational database using a large OLAP cube. The large OLAP cube includes a derived version of data of that are not required for a particular relational database query, or not required even for a small collection of queries. For example, assume that processing a relational database query requires access to only a relatively small set of data of the relational database, such as a data set which includes less than a specified percent of the relational database's data records, storage space, tables, rows, columns, and/or keys. A "large" OLAP cube is obtained, namely, an OLAP cube which includes a derived version not only of the relatively small set of data that is required for the relational database query, but also a significant amount of other data. The large OLAP cube may also be "large" in the sense that it contains dimensions that are not required to answer the relational database query. A response to the relational database query is generated by using the large OLAP cube rather than using an OLAP cube tailored to the query, and rather than querying the relational database directly. The large OLAP cube may be created after identifying a set of frequently sought data and/or filters used in queries to the relational database.

In some embodiments, a smaller OLAP cube is created by extracting data from the large OLAP cube. Data is then pulled from the smaller OLAP cube in response to a query. The smaller OLAP cube may contain fewer data items than the large OLAP cube, occupy less storage space, and have fewer dimensions than the large OLAP cube. However, in some cases the smaller OLAP cube has a particular dimension that is not included in the large OLAP cube, even though the smaller OLAP cube has fewer dimensions.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
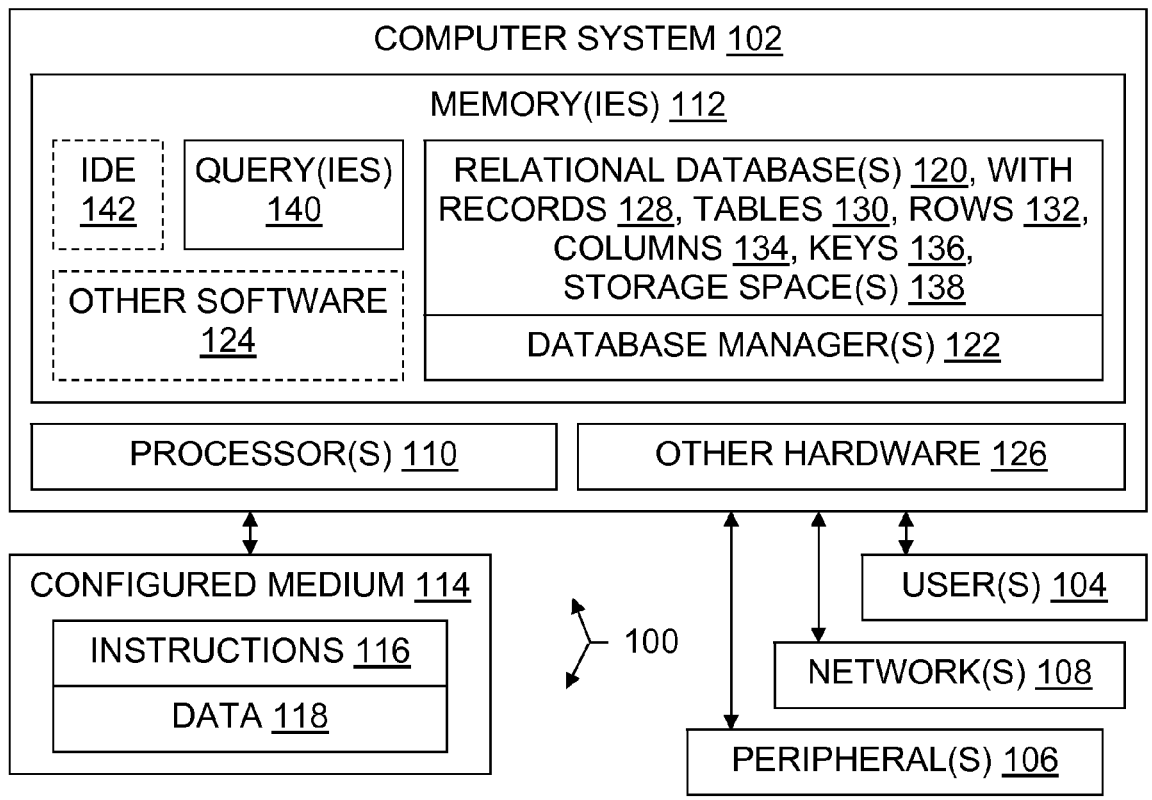
FIG. 1 is a block diagram illustrating a computer system having at least one processor, at least one memory, at least one relational database, and other items in an operating environment which may be present on multiple network nodes, and also illustrating configured storage medium embodiments.

A commercial database, such as a sales or manufacturing database, may contain hundreds of gigabytes of data, and also contain hundreds of gigabytes of indexes. Accessing such large databases can be time consuming, with some queries taking hours to process. Queries may also be very complex, requiring many different joins and a strong understanding of the database and the query language. Reductions in data size and query complexity can be achieved by creating small OLAP cubes that are tailored to specific queries.

For example, a Microsoft "MSSales" sales database contains over three hundred gigabytes of data and over four hundred gigabytes GB of indexes. This data is consumed by many different users throughout Microsoft Corporation, and serves as a source for other reporting databases outside. Accessing this vast amount of data can be tricky and time consuming. Queries can take anywhere from a few minutes to many hours. The more users are retrieving data at one time, the longer the retrievals will take. Queries against the sales database can also be very complex, requiring many different joins and an understanding of both the database and SQL, even though tools are provided to reduce some of this complexity.

As the amount of data within the sales database continues to grow, so will the time it takes to get that data out of the sales database so it can be used as desired. In this context, it was discovered that using a Microsoft Analysis Services™ tool to extract the data rather than using SQL mitigates these problems.

One embodiment uses an Analysis Services™ tool as a starting point for data extracts. Data is processed from a SQL database into a large Analysis Services OLAP cube. Data is then extracted from the large cube rather than the SQL database for future queries. For instance, a large OLAP cube is processed off of the sales database to derive aggregated data items containing five years of the most commonly used data. Unlike a small OLAP cube tailored to a particular query or small set of closely related queries, the large OLAP cube contains a lot of data that is not needed to answer any particular query. Processing to create this large cube also takes a significant amount of time, e.g., between four and eight hours. Once processing is complete, however, the large OLAP cube can be queried using various tools. The large OLAP cube has much faster query performance than a SQL database, albeit with somewhat less flexibility and range in the queries it can handle.

Sometimes, the data that is extracted is then staged and used to build one or more other OLAP cubes which are then used for browsing, reporting and other small queries. These smaller OLAP cubes take only minutes to process since they are built off much smaller sets of data. Other times, the data that is extracted from the large OLAP cube is put into flat files so that they can be consumed by other reporting groups. One such reporting group is the Rhythm of the Business Group, which used to receive a weekly extract from the sales database that took around sixteen hours to perform. With the Analysis Services™ extract approach, their extract only takes two minutes.

The Analysis Services™ extract approach also simplifies storage of meta data. Users do not need to know how one table joins to another to use the large OLAP cube. The Analysis Services™ extract approach is also very good at performing certain calculations such as year over year, period to date, percent of total and inventory. These calculations can be pulled directly from the large OLAP cube during an extract rather than be calculated with an expensive and complex SQL query.

The SQL team was very surprised to learn about this use of Analysis Services™ capabilities, and indicated that the Analysis Services™ tool was not intended to be used for data extracts. Rather, the Analysis Services™ tool was designed to be used for reporting queries that would return a smaller set of data.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

Throughout this document, use of the optional plural "(s)" means that one or more of the indicated feature is present. For example, "cube(s)" means "one or more cubes" or equivalently "at least one cube".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. In particular, databases 120 often store data representative of real-world items. Such data is also transformed as discussed herein, e.g., by extraction into OLAP cubes, modification, display, creation, loading, and/or other operations.

Memories 112 may be of different physical types. A relational database 120, a database manager 122 for accessing (read, write, define keys, etc.) the database 120, other software 124, and other items shown in the Figures may reside partially or entirely within one or more memories 112, thereby configuring those memories. An operating environment may also include other hardware 126, such buses, power supplies, and accelerators, for instance.

The relational database 120 includes data records 128, tables 130, rows 132, columns 134, keys 136, and other familiar components. SQL terminology is used herein, but it will be understood to correspond with other relational database terminology, e.g., SQL tables correspond to relational database relations, SQL rows correspond to tuples, SQL columns correspond to attributes, and vice versa. Embodiments are not limited to those which employ SQL. The relational database 120 is located in one or more storage spaces 138, e.g., hard disks, magnetic tapes, optical storage media, RAM, and so on. Access to the relational database 120 occurs in part through queries 140 submitted by a user to the database manager 122. Other accesses may be performed with other software, e.g., optimizers, data entry tools, index builders, and so on.

A given operating environment 100 may include an Integrated Development Environment (IDE) 142 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the fields of software development and database management per se that use relational databases, online analytical processing cubes, or both.

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
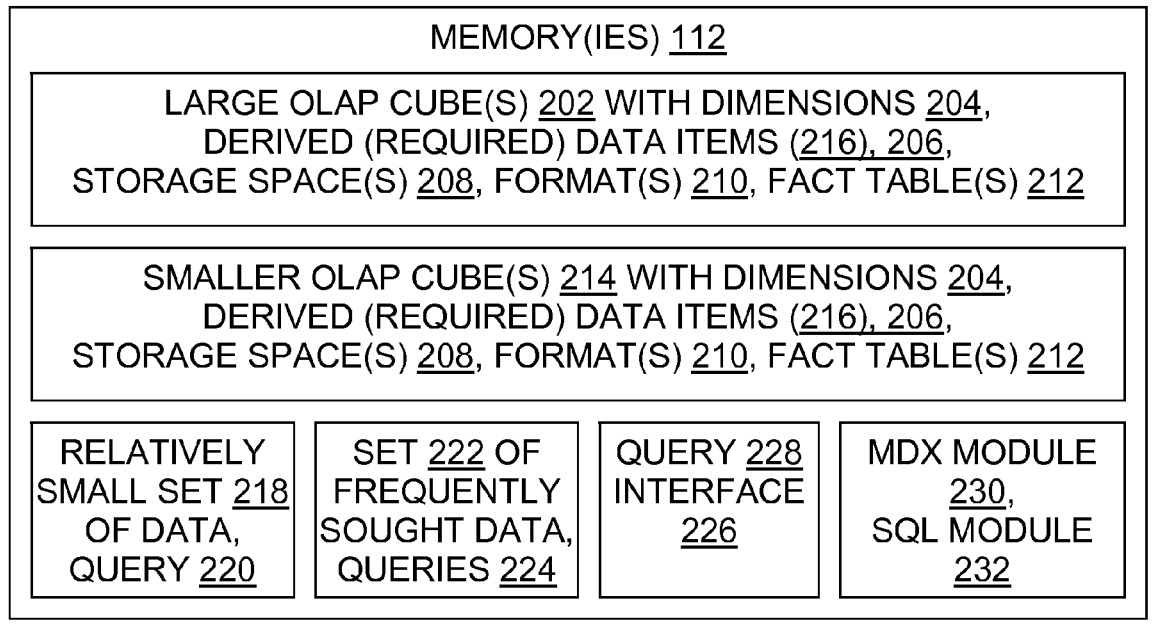
FIG. 2 is a block diagram illustrating a large OLAP cube and smaller OLAP cubes in an example architecture.

FIG. 2 illustrates an architecture which is suitable for use with some embodiments. A relational database 120 may be present in the architecture, but is not required in every embodiment because one may focus on online analytical processing (OLAP) cube(s) already obtained in a given embodiment.

Some embodiments include a large OLAP cube 202. The cube 202 is larger than it needs to be to handle the query; how much larger, and in what ways, depends on the particulars of the embodiment in question. The meaning of "large" depends on the embodiment but is specific in the context of a particular embodiment. Examples of precise definitions of "large" and other qualifiers ("smaller", "small") are provided herein, in terms for example of familiar OLAP cube characteristics such as dimensions 204, derived data items 206 generally, storage space 208 size, storage format 210, and fact tables 212. The meaning of "large" may also be defined with regard to the relational database 120 from which a cube 202 is derived, as described herein. A large OLAP cube 202 may be stored in one or more of the following familiar formats 210: MOLAP, ROLAP, HOLAP.

Some embodiments also include smaller OLAP cube(s) 214 in addition to a large OLAP cube 202. The meaning of "smaller" depends on the embodiment but is specific in the context of a particular embodiment, and may be defined for example by comparing the number of dimensions 204 of the smaller OLAP cube with the number of dimensions of the large OLAP cube from which the smaller OLAP cube was created.

A distinction is made in some embodiments between the derived data items 206 of the cube overall, and a proper subset of required data items 216 which consists of data items 206 that are required to answer a specified query 140. That is, the content of the required data items 216 is query-dependent, but is precisely determinable for any given query.

A corresponding distinction exists between the data records 128 generally of a relational database 120, and the relatively small set 218 of data records 128 (and/or tables, rows, columns, etc.) that are required to answer a specified query 220, 140. A relational database 120 also includes a set 222 of frequently sought data records 128 (and/or tables, rows, columns, etc.) which are required to answer queries 140 in a time-limited set of frequent queries 224, 140. The frequent queries 224 may be defined, for example, as all queries 140 occurring within a specified two-week period, or all queries 140 occurring at least twice within a specified three-week period, or all queries 140 from a specified set of users occurring within a specified one-week period, etc.

Some embodiments include an OLAP cube query interface 226, which may be provided by one or more familiar OLAP browsing or reporting tools, for example. The OLAP query interface 226 can be substantially simpler and easier to use than the database manager 122, because forming cube queries 228 does not require knowledge of the particular database tables, rows, and so on used in a given relational database. Cube queries 228 can be stated instead in terms of dimensions 204, which are more familiar to business users, for example.

Some embodiments include an MDX module 230 which accepts queries and other commands in a query and calculation language known as MDX (MultiDimensional expressions). Some MDX modules 230 are configured to create the smaller OLAP cube 214 from the large OLAP cube 202. MDX is designed for queries and calculations for OLAP cubes. For example, some embodiments support extraction of smaller OLAP cubes 214 from a large OLAP cube 202 by the MDX module 230.

Some embodiments include an SQL module 232 which accepts queries and other commands in the SQL language. Some SQL modules are configured to create the large OLAP cube 202 from the relational database 120. Use of SQL in embodiments is limited, e.g., the SQL module 232 is used to extract the large OLAP cube 202 from the relational database 120, but flat files and smaller OLAP cubes are extracted from the large OLAP cube 202 using the MDX module 230.

With reference to FIGS. 1 through 4 for background as well as embodiment features, it will be understood that some embodiments provide a computer system 102 with a logical processor 110 and a memory 112 configured by circuitry, firmware, and/or software. A relational database 120 configures memory 112 in operable communication with the logical processor 110. In some configurations, the relational database 120 is stored on dedicated database server(s) 302. A large OLAP cube 202 configures memory 112 in operable communication with the logical processor 110. In some configurations, the large OLAP cube 202 is stored on dedicated analysis server(s) 402. A smaller OLAP cube 214 configures memory 112 in operable communication with the logical processor 110; the smaller OLAP cube 214 may be stored on dedicated OLAP reporting server(s) 306, for example. A particular query interface 226 is also in operable communication with the logical processor 110. This query interface 226 is configured to receive a query 228 and to then access the smaller cube 214 if all data required for a query response are available in the smaller cube. Otherwise, this interface 226 accesses the large cube 202 if all data required for responding to the query are available in the large cube 202. If not, the interface falls back by accessing the relational database 120 to respond.

Figure 3:
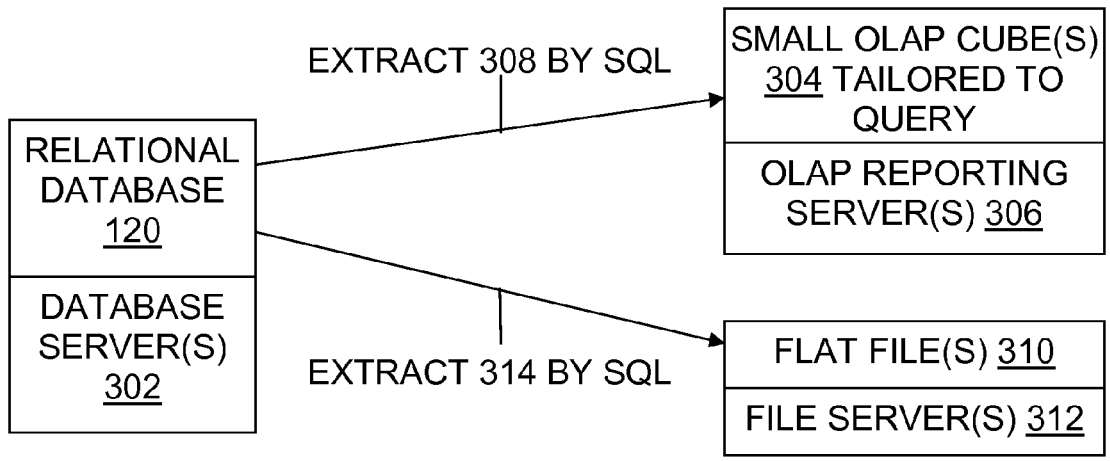
FIG. 3 is a data flow diagram illustrating a familiar data extraction approach using small OLAP cubes tailored to queries without using an intervening large OLAP cube.

By contrast, the familiar architecture shown in FIG. 3 lacks the large OLAP cube 202 which is present in most, if not all, embodiments. The large OLAP cube 202 is extracted 414 from a relational database 120 using SQL. The architecture shown in FIG. 3 also lacks the smaller OLAP cube 214 created from the large OLAP cube 202. In contrast with the FIG. 3 architecture, smaller OLAP cubes 214 are present in some though not all embodiments.

The small OLAP cubes 304 shown in FIG. 3 differ from the smaller OLAP cubes 214. Small OLAP cubes 304 are extracted 308 from a relational database 120 using SQL, whereas smaller OLAP cubes 214 are extracted from the large OLAP cube 202 with MDX. Smaller OLAP cubes 214 are either extracted 404 with MDX directly from the large OLAP cube 202, or they are extracted 406 with SQL from a relational table 408 that was extracted 410 with MDX from the large OLAP cube 202; either way, smaller OLAP cubes 214 are extracted from the large OLAP cube 202 with MDX. Smaller OLAP cubes 214 may be tailored to a set 222 of one or more queries 224.

Figure 4:
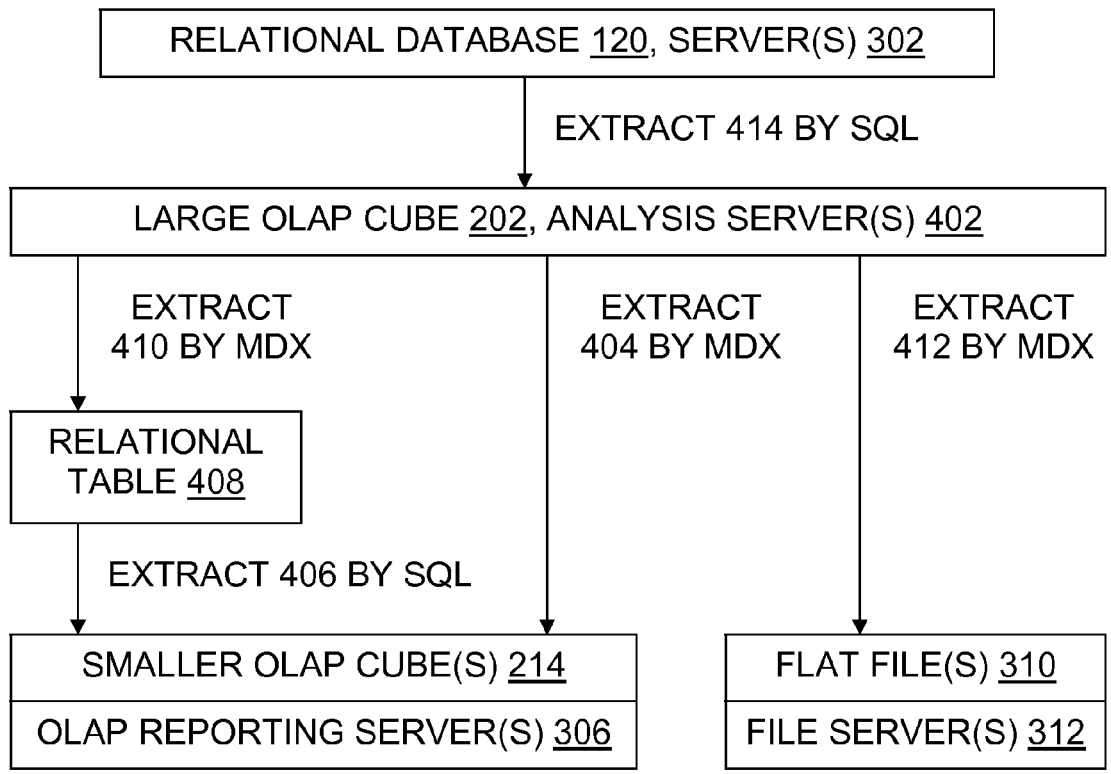
FIG. 4 is a data flow diagram illustrating a data extraction approach in embodiments using a large OLAP cube.

Another difference between the familiar architecture shown in FIG. 3 and embodiments illustrated in FIG. 4 involves flat files 310 stored on file servers 312. In the FIG. 3 architecture, flat files 310 are extracted 314 from a relational database 120 using SQL, whereas in embodiments like those illustrated in FIG. 4 flat files 310 are extracted 412 with MDX from the large OLAP cube 202.

In some embodiments, the data in the large OLAP cube 202 occupies an amount of storage space 208, and the particular set of data items 216 required for a given query occupies less than half of that cube storage. That is, the data needed for the query is less than half of the data in the OLAP cube, which is one way of specifying precisely how the OLAP cube is a "large" cube. As another example, the particular set of data required for the query occupies less than one tenth of the large cube's storage.

In some embodiments peripherals 106 such as human user I/O devices (screen, keyboard, mouse, tablet, microphone, speaker, motion sensor, etc.) will be present in operable communication with one or more processors 110 and memory 112. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Methods

Figure 5:
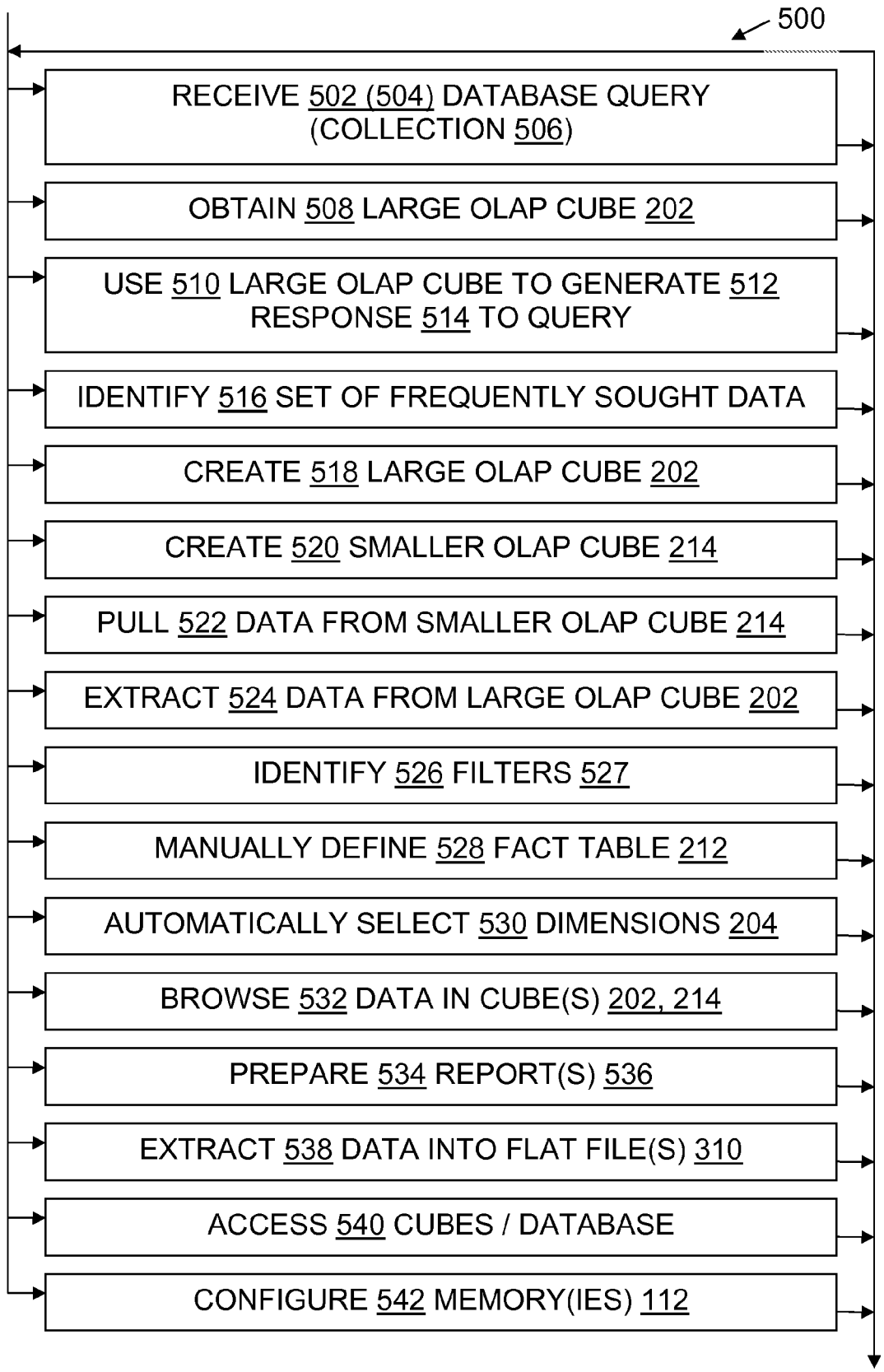
FIG. 5 is a flow chart illustrating steps of some method and configured storage medium embodiments.

FIG. 5 illustrates some method embodiments in a flowchart 500. Methods shown in the Figures may be performed in some embodiments automatically, e.g., by a query interface 226, MDX module 230, SQL module 232, large OLAP cube 202, and/or smaller OLAP cube 214 under control of a script requiring little or no user input. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 5. Steps may be performed serially, in a partially overlapping manner, or fully in parallel. The order in which flowchart 500 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a receiving step 502 (504), an embodiment receives a database query (or collection 506 of queries), such as query(ies) 140, 220, 224, 228. Steps 502, 504 may be accomplished using an interface 226 in an OLAP cube browsing or reporting tool, for example, or using a custom interface 226 in a tool which chooses accesses a smaller OLAP cube 214, a large OLAP cube 202, or a relational database 120, in that order of preference, based on the data needed to answer the query(ies) received.

During a large OLAP cube obtaining step 508, an embodiment obtains a large OLAP cube 202. Step 508 may be accomplished by obtaining access to a previously extracted 414 large OLAP cube 202, or by extracting 414 a large OLAP cube 202, for example.

During a large OLAP cube using step 510, an embodiment uses a large OLAP cube 202 to generate 512 a response 514 to the query(ies) received. For example, the embodiment may read data from the large OLAP cube 202, or may read data from the large OLAP cube 202 and perform calculations with the data to generate the response 514. A given embodiment may extract 404 a smaller OLAP cube 214 from the large OLAP cube 202 and then read data from the smaller OLAP cube 214 to generate the response 514.

During a frequently sought data identifying step 516, an embodiment identifies a set 222 of frequently sought data in a specified period. Data may be characterized in terms of how often it is sought, or the priority of the query, for example. The data set 222 may be characterized in terms of data records 128, tables 130, or another database 120 component. The time period may be any defined period, defined in terms of hours, days, weeks, months, and so on, and/or in terms of events such as the total number of queries, for example.

During a large OLAP cube creating step 518, an embodiment creates a large OLAP cube 202. Step 518 may be accomplished by extracting the large OLAP cube 202 from a relational database 120, using SQL or another language suitable for deriving an OLAP cube from a relational database. Large OLAP cube creating step 518 is an example of large OLAP cube obtaining step 508.

During a smaller OLAP cube creating step 520, an embodiment creates a smaller OLAP cube 214. In some embodiments, step 520 may be accomplished by extracting 404 the smaller OLAP cube 214 directly from a large OLAP cube 202, using MDX or another language suitable for deriving an OLAP cube from another OLAP cube. In some embodiments, step 520 may be accomplished by extracting 410 a relational table 408 from a large OLAP cube 202 and then extracting 406 the smaller OLAP cube 214 from the relational table 408, as shown in FIG. 4.

During a data pulling step 522, an embodiment pulls data from a smaller OLAP cube 214. Step 522 may be accomplished using familiar tools for browsing, reporting, and/or otherwise accessing OLAP cubes.

During a data extracting step 524, an embodiment extracts data from a large OLAP cube 202. Step 524 may be accomplished using familiar tools for browsing, reporting, and/or otherwise accessing OLAP cubes, and may include one or more of the extracting steps 404, 410, 412 shown in context in FIG. 4.

During a frequently used filters identifying step 526, an embodiment identifies a set of frequently used filters 527 from queries made in a specified period. The queries and the time period may be characterized and specified in this step 526 in a manner consistent with frequently sought data identifying step 516, for example.

During a manual fact table defining step 528, an embodiment receives a manual definition of a fact table 212, as part of smaller OLAP cube creating step 520. Step 528 may be accomplished using familiar tools for defining OLAP cubes.

During an automatic dimension selecting step 530, an embodiment automatically defines dimensions 204 as part of smaller OLAP cube creating step 520. Step 530 may be accomplished by tracking queries and/or otherwise automatically identifying dimensions used in a time period under identifying steps 516 and/or 526, and then selecting a predefined number of those dimensions 204, for example. Dimensions may also be selected 530 from identified dimensions based on the frequency of use of dimensions in queries.

During a cube browsing step 532, an embodiment operates to accept filters/commands, access data, and otherwise as needed to support a user in browsing a large OLAP cube 202 and/or a smaller OLAP cube 214. Step 532 may be accomplished using familiar tools for browsing OLAP cubes.

During a report preparing step 534, an embodiment operates to accept filters/commands, access data, and otherwise as needed to support a user in preparing report(s) 536 based on data of a large OLAP cube 202 and/or a smaller OLAP cube 214. Step 534 may be accomplished using familiar tools for reporting data from OLAP cubes.

During a flat file extracting step 538, an embodiment extracts data into flat file(s) 310 from a large OLAP cube 202 and/or a smaller OLAP cube 214. Step 538 may be accomplished using familiar tools for extracting from OLAP cubes into flat files, including for example tools for extracting 412 by MDX, and other tools.

During an accessing step 540, an embodiment performs at least one of the following steps: 404, 410, 412, 414, 510, 518, 520, 522, 524, 532, 534, 538.

During a memory configuring step 542, a memory 112 is configured by a large OLAP cube 202, a smaller OLAP cube 214, and/or otherwise in an embodiment as discussed herein.

The foregoing steps and their interrelationships are discussed in greater detail below, in connection with various embodiments.

Some embodiments provide a method for facilitating querying data of a relational database 120. The method also includes receiving 502 a query whose processing with the relational database would require access to only a relatively small set 218 of data of the relational database. The relatively small set 218 is a data set which includes (depending on the embodiment) less than fifty/forty/thirty/twenty/fifteen/ten/seven/five/three/or one percent of at least six/five/four/three/two/or one of the following aspects of the relational database: data records, storage space, tables, rows, columns, keys. In some embodiments, the method includes receiving 504 a collection of at least one thousand/five hundred/one hundred/fifty/twenty/ten/five queries whose processing taken collectively would require access only to the relatively small set 218 of data of the relational database.

The method also includes obtaining 508 a large OLAP cube 202. The large OLAP cube 202 includes a derived (e.g., extracted 414 and pre-aggregated) version of the relatively small set 218 of data that would be required for answering the query directly from the database 120. The large OLAP cube 202 also includes a derived version of some other data of the relational database 120 which would not be required for the query. That is, the cube 202 is larger than it needs to be to handle the query; how much larger, and in what ways, depends on the particulars of the embodiment in question.

The method also includes using 510 the large OLAP cube 202 to generate a response 514 to the query, rather than querying the relational database directly or using a small OLAP cube 304 that is tailored to the query.

Further to the meaning of "large", in some embodiments the large OLAP cube 202 has a number N of dimensions, and fewer than N/2 (or N/4, or N/8, or N/10, or N/20, for example, depending on the embodiment) of those dimensions are required to answer the query. That is, the cube 202 has a significant number of dimensions 204 not needed to answer a particular query. In some embodiments, the large OLAP cube 202 has at least twenty/twenty-five/thirty/thirty-five/or forty dimensions 204 for example (depending on the embodiment), and fewer than ten/twenty/thirty/another specified value (depending on the embodiment) of those dimensions are used to answer the query.

Some embodiments include identifying 516 over a period of at least one week/two weeks/one month/three months/another specified period (depending on the embodiment) a set 222 of frequently sought data which appears in queries to the relational database 120, and creating 518 the large OLAP cube 202 based on the set of frequently sought data, e.g., to contain 100 percent/90 percent/seventy-five percent/another specified percentage (depending on the embodiment) of the frequently sought data.

In some embodiments, the method includes creating 520 a smaller OLAP cube 214 by extracting data from the large OLAP cube 202, and then pulling 522 data from the smaller OLAP cube in response to a query. The smaller OLAP cube 214 may be precisely defined as smaller than the large OLAP cube 202 in at least one of the following ways, for example: the smaller cube contains fewer data items than the large cube; the smaller cube occupies less storage space than the large cube; the smaller cube has a proper subset of the dimensions of the large cube; the smaller cube has fewer dimensions than the large cube. In some embodiments, wherein the smaller OLAP cube 214 has a dimension 204 that is not included in the large OLAP cube 202, e.g., the smaller cube may have dimension(s) for Key Performance Indicator(s) and/or for specific calculations such as year-to-date, ending-inventory, year-over-year, percent-of-total, prior-year.

In some embodiments, the step of creating 520 a smaller OLAP cube includes manually defining 528 a fact table and manually selecting dimensions for the smaller cube. In some embodiments, the step of creating 520 a smaller OLAP cube includes automatically selecting 530 dimensions for the smaller cube based on queries that were answered using the large cube.

In some embodiments, the method includes browsing 532 data within the large OLAP cube 202 and/or the smaller OLAP cube 214. In some embodiments, the method includes preparing 534 a report using data pulled from the large OLAP cube 202 and/or the smaller OLAP cube 214. In some embodiments, the method includes extracting 538 data from the large OLAP cube 202 and/or the smaller OLAP cube 214 cube into a flat file.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using items such as a large OLAP cube 202, a smaller OLAP cube 214, and/or other items shown in FIG. 2, in FIG. 4, and/or methods depicted in FIG. 5, in the form of data 118 and instructions 116, read from a removable medium 114 and/or another source such as a network connection, to form a configured medium. The configured memory 112 is capable of causing a computer system to perform method steps for transforming data through extraction and otherwise as disclosed herein. FIGS. 1 through 5 thus help illustrate configured storage media embodiments and method embodiments, as well as system and method embodiments. In particular, any of the method steps illustrated in FIG. 5, or otherwise taught herein, may be used to help configure a storage medium to form a configured medium embodiment.

Conclusion

Although particular embodiments are expressly illustrated and described herein as methods, as configured media, or as systems, it will be appreciated that discussion of one type of embodiment also generally extends to other embodiment types. For instance, the descriptions of methods in connection with FIG. 5 also help describe configured media, and help describe the operation of systems and manufactures like those discussed in connection with other Figures. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method of facilitating querying data of a relational database, the method comprising the steps of:
   receiving a query whose processing would require access to only a relatively small set of data of the relational database, namely, a data set which includes less than twenty percent of at least one of the following aspects of the relational database: data records, storage space, tables, rows, columns, keys;
   obtaining a large online analytical processing cube, namely, an online analytical processing cube which includes a derived version of the relatively small set of data that is required for the query, and which also includes a derived version of some other data of the relational database which are not required for the query; and
   using the large online analytical processing cube to generate a response to the query rather than querying the relational database directly.

2. The method of claim 1, wherein the relatively small set of data includes less than fifteen percent of each of the following aspects of the relational database: data records, storage space, tables, rows, columns, keys.

3. The method of claim 1, wherein the relatively small set of data includes less than five percent of at least one of the following aspects of the relational database: data records, storage space, tables, rows, columns, keys.

4. The method of claim 1, wherein the method comprises receiving a collection of at least ten queries whose processing taken collectively would require access only to the relatively small set of data of the relational database.

5. The method of claim 1, wherein the large online analytical processing cube has a number N of dimensions, and fewer than N/2 of those dimensions are required to answer the query.

6. The method of claim 1, wherein the large online analytical processing cube has at least thirty dimensions, and fewer than thirty of those dimensions are used to answer the query.

7. The method of claim 1, further comprising the steps of identifying over a period of at least two weeks a set of frequently sought data which appears in queries to the relational database, and creating the large online analytical processing cube based on the set of frequently sought data.

8. The method of claim 1, wherein the method comprises:
   creating a smaller online analytical processing cube by extracting data from the large online analytical processing cube; and then
   pulling data from the smaller online analytical processing cube in response to a query;
   wherein the smaller online analytical processing cube is smaller than the large online analytical processing cube in at least one of the following ways:
      the smaller cube contains fewer data items than the large cube;
      the smaller cube occupies less storage space than the large cube;
      the smaller cube has a proper subset of the dimensions of the large cube.

9. The method of claim 8, wherein the smaller online analytical processing cube has a dimension that is not included in the large online analytical processing cube.

10. A computer-readable medium configured with data and instructions for performing a method for facilitating querying data of a relational database, the method comprising the steps of:
    receiving queries whose processing collectively would require access to only a relatively small set of data of the relational database, namely, a data set which includes less than ten percent of at least two of the following aspects of the relational database: data records, storage space, tables, rows, columns, keys; and
    using a large online analytical processing cube to generate responses to the queries rather than querying the relational database directly, the large online analytical processing cube including a derived version of the relatively small set of data that is required for the queries, and also including a derived version of other data of the relational database which are not required for any of the queries.

11. The configured medium of claim 10, wherein the large online analytical processing cube has a number N of dimensions, and fewer than N/5 of those dimensions are required to answer each of the queries.

12. The configured medium of claim 10, wherein the large online analytical processing cube has at least thirty dimensions, and fewer than fifteen of those dimensions are used to answer each of the queries.

13. The configured medium of claim 10, wherein the method further comprises the steps of identifying over a period of at least one week a set of filters which are used to answer queries to the relational database, and creating the large online analytical processing cube based on the set of filters.

14. The configured medium of claim 10, wherein the method comprises:
    creating a smaller online analytical processing cube by extracting data from the large online analytical processing cube; and then pulling data from the smaller online analytical processing cube in response to a query;

wherein the smaller online analytical processing cube is smaller than the large online analytical processing cube in at least one of the following ways:
the smaller cube contains fewer data items than the large cube;
the smaller cube occupies less storage space than the large cube;
the smaller cube has a smaller number of dimensions than the large cube.

15. The configured medium of claim 14, wherein the step of creating a smaller online analytical processing cube comprises at least one of the following:
manually defining a fact table and manually selecting dimensions for the smaller online analytical processing cube;
automatically selecting dimensions for the smaller online analytical processing cube based on queries that were answered using the large online analytical processing cube.

16. The configured medium of claim 10, wherein the method comprises at least one of the following steps:
browsing data within an online analytical processing cube;
preparing a report using data pulled from an online analytical processing cube;
extracting data from an online analytical processing cube into a flat file.

17. The configured medium of claim 10, wherein the method comprises calculating at least one of the following for at least one data field: year-to-date, ending-inventory, year-over-year, percent-of-total, prior-year.

18. A computer system comprising:
a logical processor;
a relational database configuring memory in operable communication with the logical processor;
a large online analytical processing cube configuring memory in operable communication with the logical processor;
a smaller online analytical processing cube configuring memory in operable communication with the logical processor; and
a query interface in operable communication with the logical processor, the query interface configured to receive a query and to then access the smaller cube if all data required for a query response are available in the smaller cube, otherwise to access the large cube if all data required for a query response are available in the large cube, and otherwise to access the relational database.

19. The system of claim 18, wherein the system further comprises a SQL module configured to create the large online analytical processing cube from the relational database, and an MDX module configured to create the smaller online analytical processing cube from the large online analytical processing cube.

20. The system of claim 18, wherein the large online analytical processing cube is stored in at least one of the following formats: MOLAP, ROLAP, HOLAP.

* * * * *